United States Patent [19]
Kelly

[11] Patent Number: 5,981,920
[45] Date of Patent: Nov. 9, 1999

[54] FURNACE FOR HEATING GLASS SHEETS

[75] Inventor: Joseph B. Kelly, Crestline, Ohio

[73] Assignee: PPG Industries Ohio, Inc., Cleveland, Ohio

[21] Appl. No.: 08/928,785

[22] Filed: Sep. 12, 1997

[51] Int. Cl.$^6$ ............................................. H05B 3/44
[52] U.S. Cl. ........................................................ 219/544
[58] Field of Search ............................ 65/606, 107, 29; 373/109; 250/496.1, 498.1, 506.1, 515.1; 338/10, 11, 226, 267, 268, 270, 277, 290; 219/544, 542, 538, 558; 392/407, 478

[56] References Cited

U.S. PATENT DOCUMENTS

| | | | |
|---|---|---|---|
| 2,887,556 | 5/1959 | Djinis et al. ........................... | 201/63 |
| 3,675,619 | 7/1972 | Burd ...................................... | 118/48 |
| 3,684,859 | 8/1972 | Deslodge .............................. | 219/354 |
| 3,699,309 | 10/1972 | Eck ....................................... | 219/553 |
| 4,139,359 | 2/1979 | Johnson ................................ | 65/107 |
| 4,496,386 | 1/1985 | Hymore et al. ....................... | 65/106 |
| 4,529,123 | 7/1985 | Johnson ................................ | 237/1 R |
| 4,666,492 | 5/1987 | Thimons et al. ...................... | 65/29 |
| 4,767,434 | 8/1988 | Schwartz et al. ..................... | 65/29 |
| 4,796,562 | 1/1989 | Brors et al. ........................... | 118/725 |
| 4,830,650 | 5/1989 | Kelly ..................................... | 65/106 |
| 5,049,725 | 9/1991 | Abramson ............................. | 219/347 |
| 5,329,097 | 7/1994 | Jones et al. ........................... | 219/530 |
| 5,362,033 | 11/1994 | Sakurai et al. ....................... | 266/275 |
| 5,672,189 | 9/1997 | Funck et al. .......................... | 65/29.19 |
| 5,781,692 | 7/1998 | Wagner ................................. | 392/411 |

*Primary Examiner*—Teresa Walberg
*Assistant Examiner*—Daniel L. Robinson
*Attorney, Agent, or Firm*—Donald C. Lepiane

[57] ABSTRACT

A heater has a heat resistant, thermally and electrically insulating tube having an elongated opening through a wall of the tube and extending along at least a portion of the tube, and a heating element positioned within the tube and extending along at least a portion of the opening. A first portion of a section of the element extending along the opening is exposed and a second portion of the section of the element extending along the opening is shielded by the tube. In one particular embodiment of the invention, the tube is a cylindrically shaped aluminum oxide tube, the heating element is a nichrome wire coil, and the elongated opening is a slot having a constant width which extends between opposing ends of the tube.

20 Claims, 2 Drawing Sheets

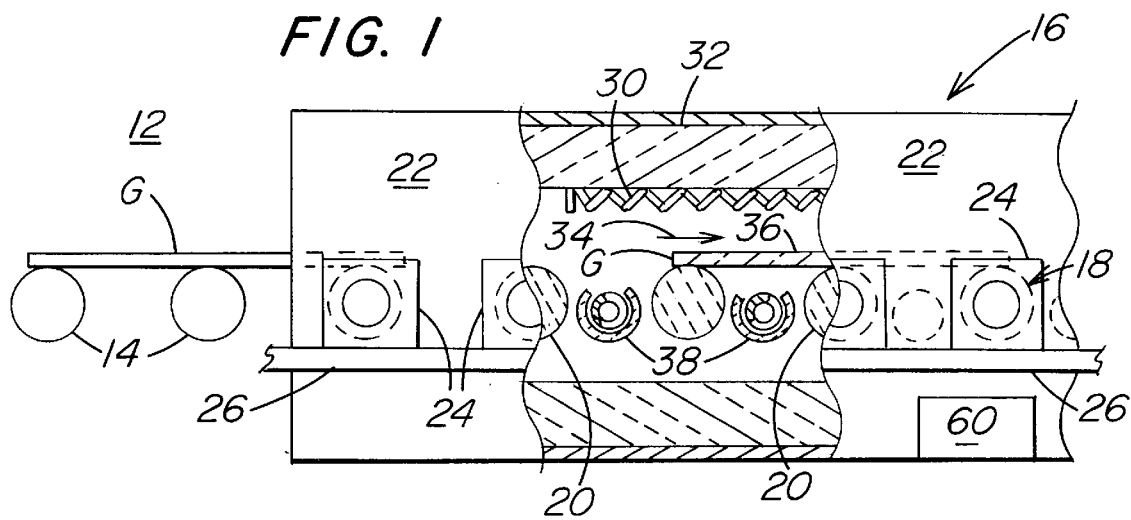
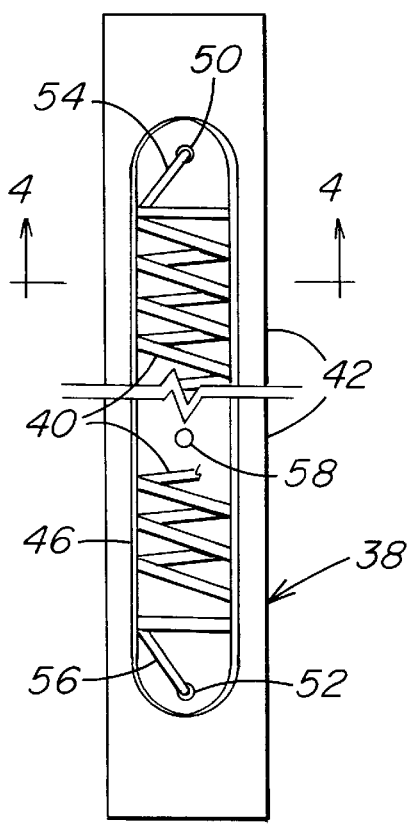
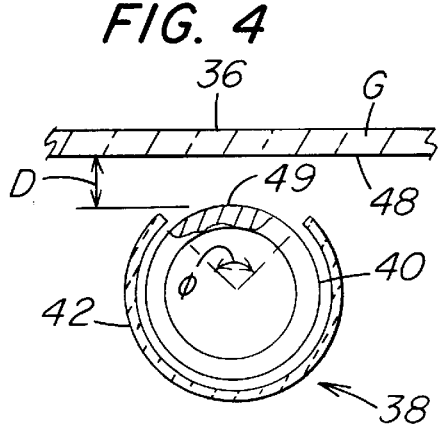

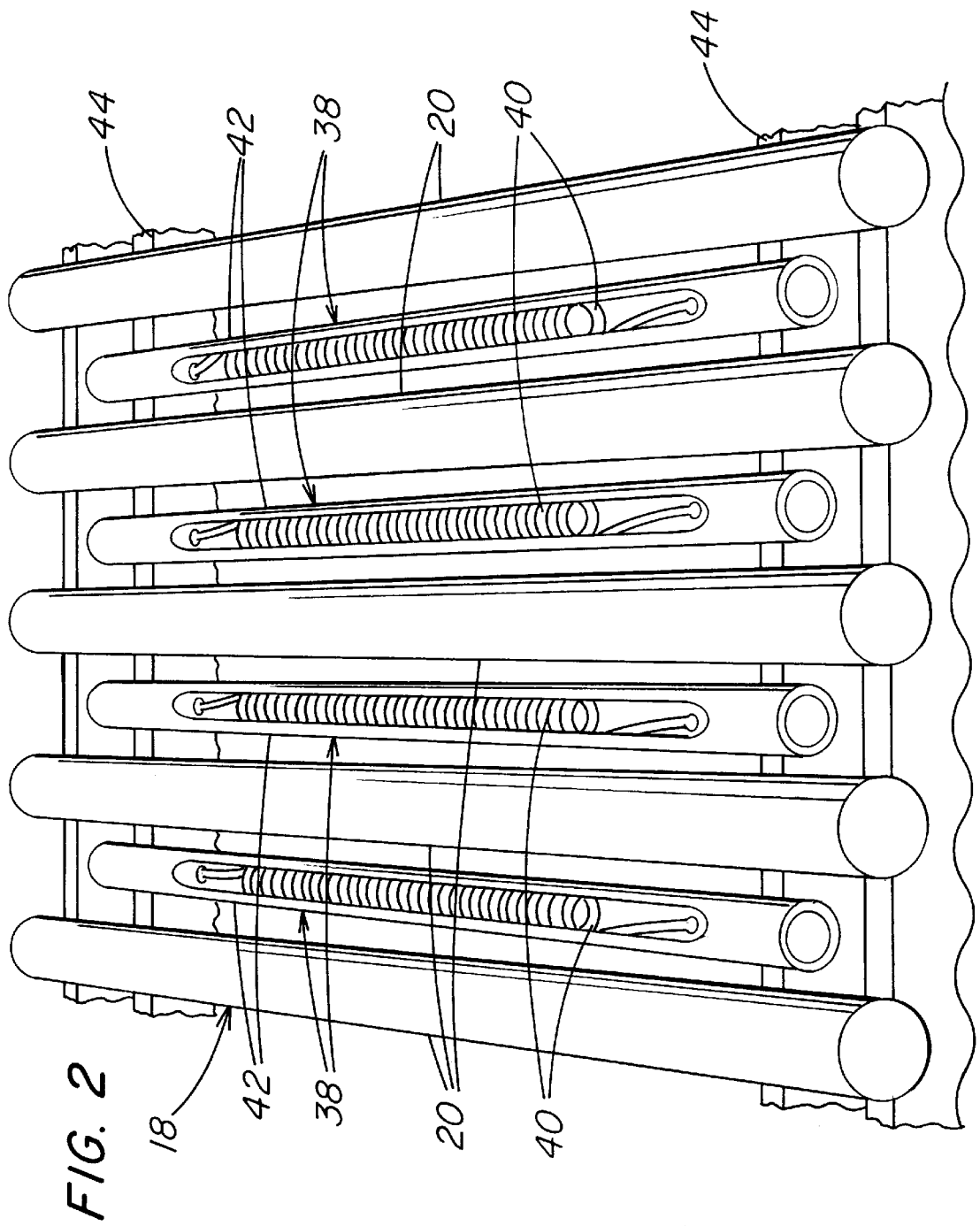

FURNACE FOR HEATING GLASS SHEETS

BACKGROUND OF THE INVENTION

1. Field of Invention

This invention relates to heating heat softenable sheet material and, in particular, to heating glass sheets that are conveyed on conveyor rolls through a sheet heating furnace.

2. Technical Considerations

Shaped and tempered glass sheets are widely used as windows in vehicles such as automobiles and the like. It is important that the windows meet stringent optical requirements and be free of optical defects that would tend to interfere with clear viewing through the window or detract from the window's appearance. Commercial production of such shaped glass sheets commonly includes the steps of serially conveying the glass sheets through a tunnel-type furnace where they are heated to their heat deformation temperature, and thereafter conveying the heat softened sheets into a shaping station where they are shaped by any of a number of well known shaping processes, e.g. as disclosed in U.S. Pat. No. 4,139,359 to Johnson, et al.; U.S. Pat. No. 4,666,492 to Thimons, et al.; U.S. Pat. No. 4,767,434 to Schwartz et al.; U.S. Pat. No. 4,496,386 to Hymore, et al. and U.S. Pat. No. 4,830,650 to Kelly. After shaping, each glass sheet is transferred to a cooling station for controlled cooling.

To heat the glass sheets, typically high powered radiant electric coils are positioned within a heating furnace along the furnace's ceiling and floor so that the glass sheets are heated from above and below. Because of the difficulty in balancing the amount of heat absorbed by the glass from the top heaters as compared to the bottom heaters, oftentimes it is difficult to keep the glass sheet flat during its initial heating. More specifically, the heat energy from the top heaters penetrates and heats the glass sheet while the conveyor rolls tend to block and absorb a majority of the heat energy directed at the glass sheet from the bottom heaters, which, in turn, increases the temperature of the conveying rolls. The rolls then heat the glass sheet by direct contact along the bottom glass surface. However, this condition tends to heat the sheet only along its surface rather than through its thickness so that the glass sheet must rely on heat conduction through the sheet to move the heat upward into its core. Since glass is a poor conductor of heat, this method of heating the bottom surface and lower portions of the sheet is inefficient. The heating imbalance results in a temperature gradient through the sheet such that there is a higher temperature in the upper portion and top surface of the sheet as compared to the lower portion and bottom surface of the sheet, which, in turn, expands the top surface more than the bottom surface and causes the glass sheet to dome upward. When doming occurs, lead edges, corners and/or points of the sheet tend to move downward below the general plane of support provided by the conveyor rolls. As the glass moves through the furnace, these portions of the sheet contact the rolls below the support plane, which may result in a scraping action between the roll surface and the glass surface. In an effort to reduce the thermal gradient and resulting doming effect, the amount of heat directed at the sheet from below the conveyor rolls may be increased but this may result in simply increasing the temperature of the conveyor rolls.

It would be advantageous to provide a heating arrangement to efficiently heat a glass sheet in a manner that reduces any temperature differential between the top and bottom surfaces of the sheet and any thermal gradient through the sheet's thickness so as to reduce glass sheet doming and associated surface marking.

SUMMARY OF THE INVENTION

The present invention provides a heater having a heat resistant, thermally and electrically insulating tube having an elongated opening through a wall of the tube and extending along at least a portion of the tube, and a heating element positioned within the tube and extending along at least a portion of the opening. A first portion of a section of the element extending along the opening is exposed and a second portion of the section of the element extending along the opening is shielded by the tube. In one particular embodiment of the invention, the tube is a cylindrically shaped aluminum oxide tube, the heating element is a nichrome wire coil, and the elongated opening is a slot having a constant width which extends between opposing ends of the tube.

The present invention also discloses a furnace for heating sheet is material having a plurality of transversely extending, longitudinally spaced conveyor rolls to support and move a sheet to be shaped along a desired path and top heaters positioned above the sheet to heat the sheet. The furnace further includes a plurality of bottom heaters extending between selected pairs of conveyor rolls and positioned below the desired path. The heaters are configured such that heat generated by the heaters is preferentially upward directly toward a sheet supported on the conveyor rolls above the heaters while the heat is shielded from conveyor rolls adjacent the bottom heaters. In one particular embodiment of the invention, the bottom heaters include a refractory tube with a nichrome wire coil extending through at least a portion of the tube. The tube includes a slot extending between its opposing ends such that a first portion of a section of the coil extending along the opening is exposed and a second portion of the section of the coil extending along the slot is shielded by the tube. A temperature measuring device associated with selected coil and a controller may be used to monitor and control coil temperature.

The present invention also discloses a method of heating sheet material including the steps of moving a sheet along a path provided by a plurality of transversely extending, longitudinally spaced conveyor rolls, positioning a plurality of bottom heaters between selected pairs of conveyor rolls and below the path, energizing the bottom heaters to generate heat, and directing a majority of the heat generated by the bottom heater upward toward a sheet supported on the conveyor rolls above the bottom heaters while shielding the majority of heat from conveyor rolls adjacent the bottom heaters.

BRIEF DESCRIPTION OF THE DRAWINGS

FIG. 1 is a partly cut-away elevational view of the loading and upstream end of a furnace for a glass sheet shaping arrangement, incorporating the present invention, with portions removed for clarity.

FIG. 2 is an enlarged perspective view of the upstream portion of the heating furnace shown in FIG. 1 illustrating the conveyor rolls and bottom heaters of the present invention, with portions removed for clarity.

FIG. 3 is a plan view of a bottom heater shown in FIG. 2, with portions removed for clarity.

FIG. 4 is a view taken along line 4—4 of FIG. 3.

DETAILED DESCRIPTION OF THE INVENTION

The present invention is taught in conjunction with heating glass sheets, but it is understood that the invention may be used in heating other types of heat softened sheet material where it is important to minimize any thermal gradient through the sheet's thickness.

An apparatus for heating and shaping sheets of heat softened materials, such as glass, typically includes a furnace through which glass sheets are serially conveyed from a loading station to heat each sheet to its deformation temperature, a shaping station to shape the glass sheets, a cooling station for cooling the shaped sheets, and an unloading zone beyond the cooling station, such as but not limited to the arrangements disclosed in U.S. Pat. Nos. 4,139,359; 4,666,492; 4,767,434; 4,496,386; and 4,830,650. If required, a sheet transfer means located at the cooling station may be used to transfer the shaped glass sheet between the shaping station and cooling station.

Referring to FIG. 1 a loading station 12 includes a plurality of longitudinally extending, transversely extending rolls 14 which transfer a glass sheet G to be heated into a furnace 16. With reference also to FIG. 2, the furnace 16 includes a horizontal conveyor 18 with longitudinally spaced, transversely extending conveyor rolls 20 that define a path of travel which extends through the furnace 16. The rolls 20 of conveyor 18 extend through furnace walls 22 and are supported by bearing blocks 24 which are mounted on rails 26 (only one rail is shown in FIG. 1) positioned outside the furnace 16. The rolls 20 are driven in any manner well known in the art. If desired, rolls 20 may be arranged in sections and their rotational speed controlled through clutches (not shown) so that the speed of each conveyor section may be controlled and synchronized in any convenient manner.

To heat the glass sheet G from above, a plurality of top heaters 30 (only one is shown in FIG. 1) are positioned above the conveyor rolls 20. Typically, top heaters 30 are high powered radiant electric coils supported below insulation 32 in any convenient manner, with the heaters 30 oriented in the direction of glass travel in the direction of the arrowed line designated by the numeral 34 through the furnace 16 to direct heat toward the top surface 36 of sheet G. Controls (not shown) are generally provided to control the heat supplied by the heaters 30 across the width of the furnace 16.

To heat the sheet G from below, heaters are typically positioned below the conveyor rolls 20. However, in the present invention, bottom heaters are configured and positioned to more efficiently heat the glass sheet G. More specifically, rolls 20 in the upstream portion of the furnace 16 are spaced apart a sufficient amount to permit placement of bottom heaters 38 (see FIGS. 2 and 3), which extend across the width of the furnace 16 between the rolls 20. Bottom heaters 38 of the present invention are directional heaters, i.e. they preferentially direct heat in a particular direction. More specifically, referring to FIGS. 2, 3 and 4, bottom heaters 38 include a heating element, which in this particular embodiment of the invention is a high powered radiant electric coil 40, positioned within a tube 42. The tube 42 is constructed from a heat resistant, thermally and electrically insulating material which resists thermal shock. In addition, the tube material is opaque to energy wavelengths generated by the coil 40. The coil 40 is sized such that it will not break the tube 42 when it expands upon heating. Tube 42 is supported within the furnace 16 on ledges 44 clearly shown in FIG. 2.

With reference to FIG. 3, an upper section of the tube 42 includes an elongated opening or slot 46 through the tube wall. At least a portion of the coil 40 extends along the slot 46 so that only a portion of the coil 40 positioned along the slot 46 is exposed while the remaining portion of the coil 40 extending along the slot 46 is shielded. In this fashion, the heat generated by the coil 40 is preferentially directed in a desired direction, and more specifically through slot 46 toward the bottom major surface 48 of the glass sheet G (see FIG. 4) while the tube 42 shields a majority of the heat from the rolls 18. As a result, more direct heat will penetrate and heat the glass sheet G and there will be less transfer of heat from the rolls 18 to the glass sheet G by direct surface contact.

Although the slot 46 in the particular embodiment of the bottom heater 38 illustrated in FIGS. 2 and 3 extends along only a portion of the tube 42, the slot 46 may extend along the entire length of tube 42. However, it is preferred that the slot 46 not extend to the ends of the tube 42 because it is believed that non-slotted ends provide additional structural strength and integrity to the tube 42. In addition, the slot 46 may have a constant width as shown in FIGS. 2 and 3 or the slot width may be varied along the length of the slot. It should also be appreciated that depending on the width and shape of slot 46 and the size and shape of the coil 40 within tube 42, the upper portion 49 of the coil 40 may extend beyond the walls of the tube 42 in the vicinity of slot 46, as shown in FIG. 4.

Although not limiting in the present invention, in order to provide electrical power to the coil 40, openings 50 and 52 are provided in tube 42 to accept electrical leads 54 and 56 for the coil 40. As an alternative, leads 54 and 56 may extend through the ends of the tube 42. In addition, if desired, an additional opening 58 may be provided in the tube 42 for placement of a temperature measuring device (not shown), e.g. a thermocouple, which is connected to a controller 60 (shown only in FIG. 1) to monitor and maintain desired coil temperature settings and thus control the amount of heat directed at the bottom surface 48 of the sheets G.

If desired, the bottom heaters 38 may be divided into several groups with controller 60 controlling the coil temperature setting for each group. The individual heaters 38 in each group may be positioned consecutively within the furnace 16 or interspersed between heaters from other groups. In addition, the coil length for each group of heaters or for each heater within the same group may be varied. It is further contemplated that the coil temperature setting for each heater 38 may be individually controlled by controller 60.

In configuring the bottom heater 38, it should be appreciated that the desired width of the slot 46 and the distance D as shown in FIG. 4, between the upper portion 49 of coil 40 and bottom sheet surface 48 will depend on the tube 42 diameter, the spacing between rolls 20 and the amount of heat shielding to be provided by the tube 42. Although not required, it is preferred that the slot 46 and distance D be sized to minimize the amount of heat generated by coil 40 that is directed toward the adjacent rolls 20. It should be further appreciated that distance D should be at least the is minimum required to prevent the glass sheet G from contacting the heaters 38 in the event that there is a malfunction in the heater controls resulting in a thermal gradient in the sheets G sufficient to cause doming of the sheets. It is expected that the spacing distance D may vary from about 0.25 to 1.5 inches (0.64 to 3.81 cm).

It is noted that the tubes 42 will act as heat radiators since they are supporting and surrounding a portion of the coils 40. However, the amount of heat generated by the tubes 42 is much less than the amount of heat radiated by coils 40 so that any heating of the rolls 20 by the tubes 42 and resulting temperature changes due to such heating is minimal.

In the particular embodiment of the bottom heater 38 illustrated in FIGS. 1–4, the tube 42 is cylindrical with a circular cross-section. However, the tube 42 may have other cross-sectional shapes, such as but not limited to oval, square or triangular, provided that the shape encloses the heating element of the bottom heater in a manner that allows the heat generated by the heating element to be preferentially directed as discussed earlier. Similarly, although the wire coil 40 is illustrated as being circular in cross-section, the coil may be formed to other shapes.

As discussed above, by positioning the bottom heaters 38 directly below the glass sheet G and between the rolls 20, depending on slot 46 width and distance D, most, if not all of the radiant energy generated by coils 40 is directed directly toward bottom surface 48 of the glass sheet G rather than at rolls 20. This heater configuration and positioning will have a major impact on the ability to balance the heat directed at the glass sheet G. More specifically, since the heat energy transferred to the sheet G from the bottom heaters 38 is by coil radiation rather than conduction (via rolls 18), the sheet G will heat faster and better distribute the heat through the glass sheet's thickness. This will increase the temperature of the bottom surface 48 and decrease the magnitude of any thermal gradients within the glass sheet G, reducing sheet doming and associated marking of the bottom glass surface 48. The faster heating will also reduce the total time required to attain a target exit temperature of the glass sheet G and thus reduce the overall cycle time for the glass sheet shaping operation. It should be appreciated that the increased heating capability and control provided by the bottom heaters 38 is independent of the roll 18 temperature. More specifically, if additional heat is required along the bottom surface 48 of the sheet G, this may be accomplished by increasing the electrical power supplied to the coils 40 without substantially increasing the temperature of rolls 20, since any additional direct heat from the coils 40 will be shielded from rolls 20 by tubes 42. It should be further appreciated that increasing electrical power to the coil 40 to provide more heat will change the wavelength distribution of the energy generated by the coils 40 towards a shorter wavelength which more readily penetrates the glass sheet G so that not only is the bottom glass surface 48 heated more quickly but also the core portions of the glass sheet G.

An additional benefit to be gained when using the bottom heaters 38 of the present invention relates to coil 40 deformation. More specifically, when the coil 40 is energized and heated, it begins to expand and grow. If permitted, the coil may develop a "hump" which, depending on the distance between the coil 40 and bottom sheet surface 48, could extend above the path of the glass sheets G provided by rolls 20 so that the coil 40 contacts the sheets G. By enclosing a majority of the coil 40 within the tube 42, this amount of deformation cannot occur.

Although not limiting in the present invention, in one particular heater embodiment, bottom heaters 38 were constructed from 0.144 inch (0.37 cm) diameter heavy-duty nichrome wire coils 40 positioned within cylindrically shaped aluminum oxide tubes 42. The coils 40 were 26 inches (66 cm) long and had a 1.59 inch (4.04 cm) outer diameter and 2.44 turns per inch (0.96 turns per cm). The tubes 42 had a 2 inch (5.08 cm) outer diameter and a 1.75 inch (4.45 cm) inner diameter. Each tube 42 was provided with a 1.375 inch (3.49 cm) constant width slot 46 along a portion of the upper side of the tube 42, as shown in FIGS. 2 and 3, and the entire coil 40 was positioned within the length of the slot 46. Referring to FIG. 4, this particular bottom heater 38 configuration provided a radial opening $\phi$, i.e. the angle of the opening in tube 42 formed by slot 46 as measured from the center of the tube 42, of approximately 104 degrees. However, as discussed earlier, the slot 46 width may be varied as required. It is expected that resulting $\phi$ may vary from about 90 to 135 degrees.

In one particular furnace arrangement incorporating the bottom heaters 38 discussed above, the upstream portion of the furnace 16 was provided with 2.5 inch diameter (6.35 cm) fused silica rolls 18 spaced at 5.63 inches (14.29 cm). Six bottom heaters 38 divided into two groups were positioned between selected pairs of rolls 20 and supported on ledges 44 at the upstream portion of the furnace 16 such that the upper portion 49 of each coil 40 was approximately 0.5 inches (1.27 cm) below bottom glass sheet surface 48. The heaters 38 in each group were interspersed with those of the other group. A thermocouple was positioned in one of the coils of each group and was connected to a controller which maintained a common coil temperature setting for the heaters 38 within each group. In this particular arrangement and with coil temperature settings of up to 1570° F. (854° C.), the time required for the sheets G to reach their desired exit temperature was reduced so that production increased on the average by about 10 percent, and at times as much as 30 percent, when compared to the same arrangement without the bottom heaters 38, while eliminating scuff marking along the bottom surface 48. In addition, there were no signs of bottom surface overheating.

In another furnace arrangement, 14 heaters 38 were positioned between selected pairs of conveyor rolls within the first 20 feet (6.1 m) of a furnace 16 having the same roll and spacing configuration as described above with the top portion 49 of the coils spaced about 0.5 inches (1.27 cm) below bottom glass surface 48. The heaters 38 were divided into three groups with heaters from each group interspersed with those in the other groups. A thermocouple was positioned in one of the coils of each group and was connected to a controller which maintained a common coil temperature setting for the heaters 38 within each group. One group of heaters 38 had a coil 40 configuration as discussed above and the other two sets had 18 inch (45.7 cm) long coils 40 constructed from 0.128 inch (0.325 cm) diameter heavy-duty nichrome wire. The coils 40 had a 1.56 inch (3.96 cm) outer diameter and 3.05 turns per inch (1.2 turns per cm). When running the groups of bottom heaters 38 at coil temperature settings between 1120 to 1330° F. (604 to 721° C.), it was found that the difference between the top surface 36 and bottom surface 48 temperatures, which was as much as 80° F. (44° C.) when bottom heat was not used, was reduced to a maximum of 25° F. (14° C.) after 15 seconds of heating and was essentially eliminated after 20 seconds of heating. It should be appreciated that there still may be a temperature gradient through the glass sheet G after the initial heating, with the core temperature being lower than the surface temperatures, but it was observed that this condition did not cause the sheet G to dome. Further monitoring of this heating arrangement showed that by increasing the coil temperature settings of the bottom heaters 38, it was possible to create a condition whereby the top surface temperature was higher than the bottom surface temperature. From these results it was concluded that by using the bottom heaters 38 and the heating arrangement disclosed herein, it was possible to drive the heat through the glass sheet G from the bottom to the top.

It should be appreciated that although the heating element in bottom heaters 38 as discussed above was a nichrome wire coil, other high resistance wire as well as other types of heating elements, such as but not limited to quartz heaters, silicon carbide resistance elements and gas fired radiant tube heaters, may be used in combination with tube 42. In addition, the tube 42 may be constructed from materials other than aluminum oxide, such as but not limited to zirconia, mullite or other refractory material.

The heater 38 configuration discussed earlier and illustrated in FIG. 2 shows a single coil 40 within tube 42. However, it is contemplated that multiple coils may be positioned within a single tube, each with its own power controls so that only selected coils within a tube may be used to heat the glass sheets G. In this manner, if required, the heating of the sheet G may be localized and/or the heating pattern established by the bottom heaters 38 may be adjusted to accommodate various sheet G shapes. As an alternative, several shorter heaters may be used in place of a single, longer heater, with the shorter heaters individually controlled.

The heater 38 configuration and placement disclosed herein provides additional benefits when heating a glass sheet G with a decorative enamel coating, typically a border around the marginal edge of the glass sheet G. Ceramic enamels are opaque to radiation of all wavelengths. As a result, the top heaters 30 tend to heat the enamel faster than the underlying glass. Overheating the enamel may cause the sheet G to warp. To counter this condition, the heat provided from the top heaters 30 may be reduced so that only the top surface 36 of the sheet G is heated. The additional heat required to heat the sheet G to its deformation temperature would be provided from the bottom heaters 38, with the heat from the top and bottom heaters being balanced to avoid any warping of the glass sheet G. This type of heating arrangement would be similarly advantageous when heating glass sheets having a reflective coating on their top surface 36. Since the coating would tend to reflect the heat delivered by the top heaters 30, rather than increasing the temperature of the top heaters 30, which may adversely effect the coating, power may be increased to the bottom heaters 38 so as to drive the heat through the glass sheet G from the bottom to top surfaces.

The heater and heating configurations disclosed herein are illustrative embodiments of the present invention and variations thereof may be resorted to without departing from the scope of the invention as defined by the claims that follow.

I claim:

1. A heater comprising:
    a heat resistant, thermally and electrically insulating tube having an elongated opening through a wall of said tube and extending along at least a portion of said tube; and
    a heating element positioned within said tube and extending along at least a portion of said opening such that a first portion of a second of said element extending along said opening is exposed and extends beyond said wall of said tube, and a second portion of said section of said element extending along said opening is shielded by said tube.

2. The heater as in claim 1 wherein said tube is constructed from a refractory material.

3. The heater as in claim 1 wherein said heating element is selected from a group of a wire coil, a quartz heater, a silicon carbide resistance element, and a gas fired radiant tube heater.

4. The heater as in claim 1 wherein said elongated opening is a slot extending between opposing ends of said tube.

5. The heater as in claim 4 wherein said slot has a constant width.

6. The heater as in claim 5 wherein said slot provides a radial opening of about 90 to 135 degrees.

7. The heater as in claim 1 wherein said tube is a cylindrically shaped aluminum oxide tube and said heating element is a nichrome wire coil.

8. A heater comprising:
    an elongated tube having opposed ends said elongated opening having a radial opening of about 90 to 135 degrees, a hollow interior and an elongated opening between the ends, the hollow interior and elongated opening defined by a continuous wall surrounding the hollow interior and selectively having a portion removed to provide the elongated opening and to expose the hollow interior, the wall made of:
        a heat resistant, and thermally and electrically insulating material; and
        a heating element positioned within the hollow interior and extending along at least a portion of said elongated opening such that a first portion of said element extending along said opening is exposed and extends beyond the wall and a second portion of said element extending along said opening is adjacent to and faces interior surface of the wall.

9. The heater as in claim 1 wherein said tube is constructed from a refractory material.

10. The heater as in claim 1 wherein said heating element is selected from a group of a wire coil, a quartz heater, a silicon carbide resistance element, and a gas fired radiant tube heater.

11. The heater as in claim 1 wherein said elongated opening is a slot extending between opposing ends of said tube.

12. The heater as in claim 11 wherein said slot has a constant width.

13. The heater as in claim 1 further including a temperature measuring device associated with said heating element.

14. The heater as in claim 13 further including a controller to monitor and control heating element temperature.

15. The heater as in claim 1 wherein said tube is a cylindrically shaped aluminum oxide tube and said heating element is a nichrome wire coil.

16. The heater as in claim 15 wherein said elongated opening is a slot having a constant width which extends between opposing ends of said tube.

17. The heater as in claim 16 further including a temperature measuring device associated with said heating element.

18. The heater as in claim 1 wherein the elongated opening extends from one of the opposed ends to the other one of the opposed ends, and length of the elongated opening is measured between the ends, and width of the elongated opening and of the heating element are sized to prevent the heating element from passing through the elongated opening when the heating element is energized.

19. The heater as in claim 18 wherein the heating element is a heating coil having a diameter and the tube has a circular cross section having an inside diameter, the width of the elongated opening is less than the inside diameter of the tube and of the heating coil, and the diameter of the heating coil is less than the inside diameter of the tube.

20. The heater as set forth in claim 1 wherein radiant energy from the heating element when energized is substantially through the slot.

* * * * *